United States Patent [19]

Fickel

[11] 4,319,929
[45] Mar. 16, 1982

[54] SIMULATED COUNTERCURRENT SORPTION PROCESS EMPLOYING ION EXCHANGE RESINS WITH PERIODIC BACKFLUSHING

[75] Inventor: R. Gene Fickel, Roselle, Ill.

[73] Assignee: UOP Inc., Des Plaines, Ill.

[21] Appl. No.: 95,767

[22] Filed: Nov. 19, 1979

[51] Int. Cl.³ .............................................. C13D 3/14
[52] U.S. Cl. .................................. 127/46.2; 210/692; 210/673
[58] Field of Search ............. 127/46 A; 210/24, 30 R, 210/32, 34, 35, 40, 675, 676, 678, 692, 673

[56] References Cited

U.S. PATENT DOCUMENTS

| | | | |
|---|---|---|---|
| 2,985,589 | 5/1961 | Broughton et al. | 210/34 |
| 3,416,961 | 12/1968 | Mountfort et al. | 127/46 A |
| 3,565,798 | 2/1971 | Barnes | 210/675 |
| 3,706,812 | 12/1972 | Derosset et al. | 210/33 |
| 3,928,193 | 12/1975 | Melaja et al. | 210/31 C |
| 4,157,267 | 6/1979 | Odawara et al. | 127/46 A |
| 4,182,633 | 1/1980 | Ishikawa et al. | 127/46 A |

*Primary Examiner*—Ivars C. Cintins
*Attorney, Agent, or Firm*—James R. Hoatson, Jr.; Louis A. Morris; William H. Page, II

[57] ABSTRACT

A process for separating a selected component from a fluid mixture of components by employment of an ion exchange resin. Fluid flow is maintained during a separation mode through a column containing the adsorbent in at least three separation zones, an adsorption zone in which the selected component is adsorbed by the adsorbent, a purification zone and a desorption zone from which the selected component is displaced by a desorbent material. The zones are periodically shifted through the column by advancing the input and output streams. The improvement comprises periodically backflushing the resin bed in a backflushing mode distinct from the separation mode by passing a feed material through the same line that will pass the feed material in the separation mode following backflushing and removing a backflushing output stream upstream, with respect to the direction of fluid flow in the separation mode, of the feed stream inlet. The backflushing serves to decrease the density of the resin bed thereby controlling the pressure drop developed through that bed when it is in service as part of a separation zone. The ion exchange resin particularly suitable for the invention is an alkali metal salt of a nuclearly sulfonated styrene-cation exchange resin containing a cross-linking agent. The process of the invention is particularly suitable for the separation of a saccharide from an aqueous solution of saccharides.

15 Claims, No Drawings

SIMULATED COUNTERCURRENT SORPTION PROCESS EMPLOYING ION EXCHANGE RESINS WITH PERIODIC BACKFLUSHING

BACKGROUND OF THE INVENTION

1. Field of the Invention

The field of art to which this invention pertains is the solid bed adsorptive separation of components of a fluid stream. More specifically, the invention relates to process for separating a saccharide from an aqueous solution of saccharides by employing an adsorbent comprising an ion exchange resin.

2. Description of the Prior Art

It is known in the separation art that certain ion exchange resins can be used in separating components from a fluid mixture, particularly a saccharide from an aqueous solution of saccharides. Examples of such art are U.S. Pat. Nos. 4,025,357; 4,022,637; 3,928,193; 3,817,787, 3,806,363; 3,692,582; 3,416,961; 3,184,334; 3,174,876; 3,044,906; 3,044,904; and 2,813,810. Common ion exchange resins used in the prior art processes are alkali metal and alkaline earth metal salts of a polystyrene sulfonate cation exchange resin cross-coupled with divinyl benzene. It is also known to the art to periodically backflush the entire resin bed so as to accomplish uniform packing or homogeneity of resin particle size throughout the column (U.S. Pat. No. 3,928,193) or to remove accumulated dirt, etc. (U.S. Pat. No. 3,416,961). It is further known to integrate a continuous backflushing zone into a simulated moving bed scheme such as that set forth in D. B. Broughton U.S. Pat. No. 2,985,589.

The principal of the simulated moving bed to continuously separate, in liquid phase, a saccharide from a liquid feed mixture of saccharides by contact with a solid inorganic sorbent comprising particles of crystalline aluminosilicate or zeolite is also known to the art via U.S. Pat. No. 4,157,267. The simulated moving bed functions by periodically advancing through the column of adsorbent the various points of introducing and withdrawing the liquid streams.

I have discovered a process that enables the use of an ion exchange resin in the simulated moving bed scheme by the integration of a system of intermittent backflushing into such scheme.

SUMMARY OF THE INVENTION

It is accordingly a broad objective of my invention to provide a process for separating a selected component from a feed mixture comprising the selected component and one or more non-selected components by employment of an adsorbent comprising an ion exchange resin. More specifically, it is an objective of my invention to provide a simulated moving bed process in which backflushing of a portion of the ion exchange resin is periodically effected. Even more specifically, it is an objective of my invention to use such process for separating components from a fluid feed mixture comprising an aqueous solution of saccharides.

In brief summary, my invention is, in one embodiment a process for separating an extract component from a fluid feed mixture comprising the extract component and a raffinate component by employment of an adsorbent comprising an ion exchange resin having a greater selectivity for the extract component than for the raffinate component. The process comprises first, in a separation mode, the steps of: (a) maintaining fluid flow through a column of the adsorbent, which column contains separation zones comprising at least an adsorption zone, a purification zone, and a desorption zone, the zones being serially interconnected with the terminal zones of the column connected to provide a continuous connection of the zones, the fluid flow in the separation zones being in a single direction; (b) maintaining the adsorption zone in the column defined by the adsorbent located between a feed input stream at an upstream boundary of the zone and a raffinate output stream comprising the raffinate component and desorbent material at a downstream boundary of the zone; (c) maintaining the purification zone as the nearest separation zone upstream, with respect to the single direction, of the adsorption zone, the purification zone defined by the adsorbent located between an extract output stream at an upstream boundary of the purification zone and the feed input stream at a downstream boundary of the purification zone; (d) maintaining the desorption zone upstream, with respect to the single direction, of the purification zone, the desorption zone defined by the adsorbent located between a desorbent input stream at an upstream boundary of the zone and the extract output stream at a downstream boundary of the zone; (e) passing the feed mixture into the adsorption zone at adsorption conditions to effect the selective adsorption of the extract component by the adsorbent in the adsorption zone and withdrawing a raffinate output stream from the adsorption zone; (f) passing a desorbent stream into the desorption zone at desorption conditions to effect the displacement of the extract component from the adsorbent in the desorption zone; (g) withdrawing an extract output stream comprising the extract component and desorbent material from the desorption zone; (h) periodically advancing through the column of adsorbent in a downstream direction with respect to fluid flow in the adsorption zone the feed input stream, raffinate output stream, desorbent input stream, extract output stream, and backflushing output stream to effect the shifting of zones through the adsorbent and the production of extract output and raffinate output streams. The improvement to the process comprises periodically following the separation mode of the process with a backflushing mode. The backflushing mode comprises maintaining as the sole input stream to the column the feed input stream through the same transfer means as to be used for the feed input stream in the next following occurrence of the separation mode. A backflushing output stream is withdrawn as the sole output stream from the column during the backflushing mode and is upstream, with respect to the single direction mentined in step (a), of the feed input stream. This effects the backflushing of the adsorbent located between the feed input stream and the backflushing output stream.

Other objectives and embodiments of my invention encompass details about feed mixtures, adsorbents, desorbent materials and operating conditions, all of which are hereinafter disclosed in the following discussion of each of the facets of the present invention.

DESCRIPTION OF THE INVENTION

At the outset the definitions of various terms used throughout the specification will be useful in making clear the operation, objects and advantages of my process.

A feed mixture is a mixture containing one or more extract components and one or more raffinate components to be separated by my process. The term "feed stream" indicates a stream of a feed mixture which passes to the adsorbent used in the process.

An "extract component" is a compound or type of compound that is more selectively adsorbed by the adsorbent while a "raffinate component" is a compound or type of compound that is less selectively adsorbed. In one embodiment of this process, a ketose is an extract component and an aldose is a raffinate component. The term "desorbent material" shall mean generally a material capable of desorbing an extract component. The term "desorbent stream" or "desorbent input stream" indicates the stream through which desorbent material passes to the adsorbent. The term "raffinate stream" or "raffinate output stream" means a stream through which a raffinate component is removed from the adsorbent. The composition of the raffinate stream can vary from essentially 100% desorbent material to essentially 100% raffinate components. The term "extract stream" or "extract output stream" shall mean a stream through which an extract material which has been desorbed by a desorbent material is removed from the adsorbent. The composition of the extract stream, likewise, can vary from essentially 100% desorbent material is essentially 100% extract components. At least a portion of the extract stream and preferably at least a portion of the raffinate stream from the separation process are passed to separation means, typically fractionators or evaporators, where at least a portion of desorbent material is separated to produce an extract product and a raffinate product. The terms "extract product" and "raffinate product" mean products produced by the process containing, respectively, an extract component and a raffinate component in higher concentrations than those found in the extract stream and the raffinate stream. Depending on the composition of the feed mixture and the operating conditions employed, in one embodiment of my process, a high-purity fructose product or a high-purity glucose product (or both) can be prepared as the extract product or the raffinate product. The term "high-purity" as used herein shall mean that the concentration of an extract component in the extract product or the concentration of a raffinate component in the raffinate is at least 50% and more preferably about 75% or higher, expressed as a percent of total extract and raffinate components present in the product stream. Although it is possible by the process of this invention to produce a high purity extract product or raffinate product (or both) at high recoveries, it will be appreciated that an extract component is never completely adsorbed by the adsorbent, nor is a raffinate component completely non-adsorbed by the adsorbent. Therefore, varying amounts of a raffinate component can appear in the extract stream and, likewise, varying amounts of an extract component can appear in the raffinate stream. The extract and raffinate streams then are further distinguished from each other and from the feed mixture by the ratio of the concentrations of an extract component and a raffinate component appearing in the particular stream. More specifically, the ratio of the concentration of an extract component to that of a less selectively adsorbed raffinate component will be lowest in the raffinate stream, next highest in the feed mixture, and the highest in the extract stream. Likewise, the ratio of the concentration of a less selectively adsorbed raffinate component to that of the more selectively adsorbed extract component will be highest in the raffinate stream, next highest in the feed mixture, and the lowest in the extract stream.

The term "selective pore volume" of the adsorbent is defined as the volume of the adsorbent which selectively adsorbs an extract component from the feed mixture. The term "non-selective void volume" of the adsorbent is the volume of the adsorbent which does not selectively retain an extract component from the feed mixture. This volume includes the cavities of the adsorbent which contain no adsorptive sites and the interstitial void spaces between adsorbent particles. The selective pore volume and the non-selective void volume are generally expressed in volumetric quantities and are of importance in determining the proper flow rates of fluid required to be passed into an operational zone for efficient operations to take place for a given quantity of adsorbent. When adsorbent "passes" into an operational zone (hereinafter defined and described) employed in one embodiment of this process its non-selective void volume together with its selective pore volume carries fluid into that zone. The non-selective void volume is utilized in determining the amount of fluid which should pass into the same zone in a counter-current direction to the adsorbent to displace the fluid present in the non-selective void volume. If the fluid flow rate passing into a zone is smaller than the non-selective void volume rate of adsorbent material passing into that zone, there is a net entrainment of liquid into the zone by the adsorbent. Since this net entrainment is a fluid present in non-selective void volume of the adsorbent, it in most instances comprises less selectively retained feed components. The selective pore volume of an adsorbent can in certain instances adsorb portions of raffinate material from the fluid surrounding the adsorbent since in certain instances there is competition between extract material and raffinate material for adsorptive sites within the selective pore volume. If a large quantity of raffinate material with respect to extract material surrounds the adsorbent, raffinate material can be competitive enough to be adsorbed by the adsorbent.

The term "backflush" shall mean the periodic reversal of the direction of fluid flow in that portion of the adsorbent involved in an occurrence of the backflushing mode from the direction of fluid flow that occurs in such portion during the separation mode.

A typical feed mixture which can be charged to the process of our invention is that comprising an aqueous solution of a ketose and an aldose. While the feed mixture may contain more than one ketose and more than one aldose, typically the feed mixture will contain one ketose and one aldose each in concentrations of from about 0.5 wt. % to about 30 wt. % and more preferably from about 1 to about 15 wt. %. The process may be used to separate a ketopentose from an aldopentose but more typically will be used to separate a ketohexose from an aldohexose. Well-known ketohexoses are fructose (levulose) and sorbose; well-known aldohexoses are glucose (dextrose), mannose and galactose while lesser known aldohexoses are gulose, talose, allose, altrose, and iodose. Preferred feed mixtures containing hexoses will be aqueous solutions of invert sugar, formed when sucrose is hydrolyzed by acidic materials into equi-molar amounts of fructose and glucose. Other preferred feed mixtures will be aqueous solutions of high-fructose (typically about 40–45% fructose) corn syrup produced by the enzymatic isomerization of glucose solutions.

Desorbent materials used in various prior art adsorptive separation processes vary depending upon such factors as the type of operation employed. In the swing-bed system in which the selectively adsorbed feed component is removed from the adsorbent by a purge stream desorbent selection is not as critical and desorbent materials comprising gaseous hydrocarbons such as methane, ethane, etc., or other types of gases such as nitrogen or hydrogen may be used at elevated temperatures or reduced pressures or both to effectively purge the adsorbed feed component from the adsorbent. However, in adsorptive separation processes which employ zeolitic adsorbents and which are generally operated at substantially constant pressures and temperatures to insure liquid phase, the desorbent material relied upon must be judiciously selected to satisfy several criteria. First, the desorbent material should be able to displace an adsorbed extract component from the adsorbent with reasonable mass flow rates without itself being so strongly adsorbed as to unduly prevent an extract component from displacing the desorbent material in a following adsorption cycle. Expressed in terms of the selectivity (hereinafter discussed in more detail), it is preferred that the adsorbent be more selective for all of the extract components with respect to a raffinate component than it is for the desorbent material with respect to a raffinate component. Secondly, desorbent materials must be compatible with the particular adsorbent and with the extract and raffinate components of the particular feed mixture. More specifically, they must not reduce or destroy the critical selectivity of the adsorbent for an extract component with respect to a raffinate component. Additionally, desorbent materials should not chemically react with or cause a chemical reaction of either an extract component or a raffinate component. Both the extract stream and the raffinate stream are typically removed from the adsorbent in admixture with desorbent material and any chemical reaction involving a desorbent material and an extract component or a raffinate component would reduce the purity of the extract product or the raffinate product or both. Since both the raffinate stream and the extract stream typically contain desorbent materials, desorbent materials should additionally be substances which are easily separable from the feed mixture that is passed into the process. Without a method of separating at least a portion of the desorbent material present in the extract stream and the raffinate stream, the concentration of an extract component in the extract product and the concentration of a raffinate component in the raffinate product would not be very high, nor would the desorbent material be available for reuse in the process. It is contemplated that at least a portion of the desorbent material will be separated from the extract and the raffinate streams by distillation or evaporation but other separation methods such as reverse osmosis may also be employed alone or in combination with distillation or evaporation. Since the raffinate and extract products are, in one embodiment of the invention, foodstuffs intended for human consumption, desorbent materials should also be non-toxic. Finally, desorbent materials should also be materials which are preferably readily available and therefore reasonable in cost.

I have found that in the saccharide separation embodiments of this invention water having a pH of from about 6.5 to about 8.0 satisfies these criteria and is a suitable and preferred desorbent material for our process. More preferred is water having a pH from about 6.5 to about 7.5 and even more preferred is water having a pH of $7.0 \pm 0.2$. The pH of the desorbent material is important because adsorption of a ketose by the adsorbent, removal of a raffinate stream comprising an aldose, desorption of a ketose from the adsorbent and removal of an extract stream all typically occur in the presence of desorbent material. If the desorbent material is too alkaline chemical reactions of the monosaccharides are promoted and reaction products are produced that can reduce the purity of either the ketose product or the aldose product or both. Additionally, the yield of the ketose product or aldose product will be reduced by the degree to which a ketose or an aldose have undergone chemical reaction. For example, in the presence of an acidic medium glucose tends to undergo polycondensation to yield a mixture of oligosaccharides, the largest portion of which consists of the disaccharides gentiobiose and isomaltose. In an alkaline solution the principal reaction of glucose is a partial transformation to fructose, with other ketoses, mannose, saccharinic acids, and products of decomposition occurring to a lesser degree. An alkaline solution of glucose will undergo chemical reaction until an equilibrium is established between the three monosaccharides glucose, mannose and fructose. The same equilibrium mixture may be attained by starting with either an alkaline mannose solution or an alkaline fructose solution instead of alkaline glucose solution. The explanation of this phenomenon is based upon the formation of an enol structure which is common to all three sugars. Such an interconversion by enolization can occur in any pair of epimeric aldoses and the corresponding ketose. Two aldoses which are identical except for the configuration at the asymmetric carbon atoms alpha to the aldehyde group are "epimers". Epimeric pairs of aldohexoses are allose and altrose, glucose and mannose, gulose and idose, and galactose and talose.

Water pH does of course vary widely depending upon the source of the water in addition to other factors. Methods of maintaining and controlling a desired water pH are, however, well known to those skilled in the art of water treating. Such methods generally comprise adding an alkaline compound such as sodium hydroxide or an acid compound such as hydrochloric acid to the water in amounts as necessary to achieve and maintain the desired pH.

The prior art has recognized that certain characteristics of adsorbents are highly desirable, if not absolutely necessary, to the successful operation of a selective adsorption process. Such characteristics are equally important to this process. Among such characteristics are: adsorptive capacity for some volume of an extract component per volume of adsorbent; the selective adsorption of an extract component with respect to a raffinate component and the desorbent material; and sufficiently fast rates of adsorption and desorption of an extract component to and from the adsorbent. Capacity of the adsorbent for adsorbing a specific volume of an extract component is, of course, a necessity; without such capacity the adsorbent is useless for adsorptive separation. Furthermore, the higher the adsorbent's capacity for an extract component the better is the adsorbent. Increased capacity of a particular adsorbent makes it possible to reduce the amount of adsorbent needed to separate an extract component of known concentration contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life. The second necessary adsorbent characteristic is the ability of the adsorbent to separate components of the feed; or, in other words, that the adsorbent possess adsorptive selectivity, (B), for one component as compared to another component. Relative selectivity can be expressed not only for one feed component as compared to another but can also be expressed between any feed mixture component and the desorbent material. The selectivity, (B), as used throughout this specification is defined as the ratio of the two components of the adsorbed phase over the ratio of the same two components in the unadsorbed phase at equilibrium conditions. Relative selectivity is shown as Equation 1 below.

$$\text{Selectivity} = (B) = \frac{[\text{vol. percent } C/\text{vol. percent } D]_A}{[\text{vol. percent } C/\text{vol. percent } D]_U} \quad \text{Equation 1}$$

where C and D are two components of the feed represented in volume percent and the subscripts A and U represent the adsorbed and unadsorbed phases respectively. The equilibrium conditions were determined when the feed passing over a bed of adsorbent did not change composition after contacting the bed of adsorbent. In other words, there was no net transfer of material occurring between the unadsorbed and adsorbed phases. Where selectivity of two components approaches 1.0 there is no preferential adsorption of one component by the adsorbent with respect to the other; they are both adsorbed (or non-adsorbed) to about the same degree with respect to each other. As the (B) becomes less than or greater than 1.0 there is a preferential adsorption by the adsorbent for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Ideally, adsorbents should have a selectivity for an extract component with respect to a desorbent material equal to about 0.9 to about 1.3 so that the extract component can be desorbed with reasonable flow rates of desorbent material and so that an extract component can readily displace desorbent material in a subsequent adsorption step. While separation of an extract component from a raffinate component is theoretically possible when the selectivity of the adsorbent for the extract component with respect to the raffinate component is greater than 1.0, it is preferred that such selectivity approach or exceed a value of 2.0. Like relative volatility, the higher the selectivity of an adsorbent for an extract component with respect to a raffinate component the easier the separation is to perform. Higher adsorbent selectivities for an extract component with respect to a raffinate component permit a smaller amount of adsorbent to be used. Thus, for optimum performance of the process the adsorbent must meet both selectivity requirements; its selectivity for an extract component with respect to a desorbent material should be about 0.9 to about 1.3 and its selectivity for an extract component with respect to a raffinate component should be about 2.0 or greater, and preferably 10.0 or greater. The third important characteristic is the rate of exchange of the extract component of the feed mixture material or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and therefore permit a reduction in the operating cost of the process. With faster rates of exchange, less desorbent material has to be pumped through the process and separated from the extract stream for reuse in the process.

A dynamic testing apparatus is employed to test various adsorbents with a particular feed mixture and desorbent material to measure the adsorbent characteristics of adsorptive capacity, selectivity and exchange rate. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the adsorbent chamber. A pulse test, performed using this apparatus and the following general procedure, is used to determine selectivities and other data for various adsorbent systems. The adsorbent is filled to equilibrium with a particular desorbent material by passing the desorbent material through the adsorbent chamber. At a convenient time, a pulse of feed containing known concentrations of a tracer and of a particular ketose or aldose or both all diluted in desorbent is injected for a duration of several minutes. Desorbent flow is resumed, and the tracer and the ketose and aldose are eluted as in a liquid-solid chromatographic operation. The effluent can be analyzed on-stream or alternatively effluent samples can be collected periodically and later analyzed separately by analytical equipment and traces of the envelopes of corresponding component peaks developed.

From information derived from the test adsorbent performance can be rated in terms of void volume, retention volume for an extract or a raffinate component, selectivity for one component with respect to the other, and the rate of desorption of an extract component by the desorbent. The retention volume of an extract or a raffinate component may be characterized by the distance between the center of the peak envelope of an extract or a raffinate component and the peak envelope of the tracer component or some other known reference point. It is expressed in terms of the volume in cubic centimeters of desorbent pumped during this time interval represented by the distance between the peak envelopes. Selectivity, (B), for an extract component with respect to a raffinate component may be characterized by the ratio of the distance between the center of the extract component peak envelope and the tracer peak envelope (or other reference point) to the corresponding distance between the center of the raffinate component peak envelope and the tracer peak envelope. The rate of exchange of an extract component with the desorbent can generally be characterized by the width of the peak envelopes at half intensity. The narrower the peak width the faster the desorption rate. The desorption rate can also be characterized by the distance between the center of the tracer peak envelope and the disappearance of an extract component which has just been desorbed. This distance is again the volume of desorbent pumped during this time interval.

To further evaluate promising adsorbent systems and to translate this type of data into a practical separation process requires actual testing of the best system in a continuous countercurrent liquid-solid contacting device. The general operating principles of such a device have been previously described and are found in Broughton U.S. Pat. No. 2,985,589, incorporated herein by reference thereto. A specific laboratory-size apparatus utilizing these principles is described in deRosset et al U.S. Pat. No. 3,706,812, incorporated herein by reference thereto. The equipment comprises multiple adsorbent beds with a number of access lines attached to distributors within the beds and terminating at a rotary distributing valve. At a given valve position, feed and desorbent are being introduced through two of the lines and the raffinate and extract streams are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation techniques may be found in the paper "Separation of $C_8$ Aromatics by Adsorption" by A. J. deRosset, R. W. Neuzil, D. J. Korous, and D. H. Rosback, presented at the American Chemical Society, Los Angeles, California, Mar. 28 thru Apr. 2, 1971.

Typical adsorbents to be used in the process of this invention may comprise any of those normally used in the art for chromatographically separating organic and inorganic substances in ion exchange resin beds. Suitable resins include the alkali metal and the alkaline earth metal salts of a nuclearly sulfonated styrene cation exchange resin containing a cross-linking agent. A preferred resin for use in separating fructose from a mixture of fructose and glucose is ion exchanged with calcium ions and is cross-linked with about 4.0% by weight of divinylbenzene. The resin particle size is preferably in a range of from about 20 to about 40 mesh.

The present invention employs a countercurrent moving-bed or simulated moving-bed countercurrent flow system which is known to have a much greater separation efficiency than fixed adsorbent bed systems and is therefore preferred. In the moving-bed or simulated moving-bed processes the adsorption and desorption operations are continuously taking place which allows both continuous production of an extract and a raffinate stream and the continual use of feed and desorbent streams. One preferred embodiment of this process utilizes what is known in the art as the simulated moving-bed countercurrent flow system. The operating principles and sequence of such a flow system are described in U.S. Patent 2,985,589 incorporated herein by reference thereto. In such a system it is the progressive movement of multiple liquid access points down an adsorbent chamber that simulates the upward movement of adsorbent contained in the chamber. In the separation mode of the present invention, only four of the access lines are active at any one time; the feed input stream, desorbent inlet stream, raffinate outlet stream, and extract outlet stream. In the backflushing mode only two of the access lines are active at any one time; the feed input stream and the backflushing output stream. Coincident with this simulated upward movement of the solid adsorbent is the movement of the liquid occupying the void volume of the packed bed of adsorbent. So that countercurrent contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller is provided to set and regulate these flow rates.

The active liquid access points in the separation mode effectively divide the adsorbent chamber into separate zones, each of which has a different function. In this embodiment of my process, it is generally necessary that three separate operational or separation zones be present in order for the process to take place although in some instances an optional fourth zone may be used in the separation mode. The following discussion of operation zones relates to the present invention in the separation mode.

The adsorption zone, zone 1, is defined as the adsorbent located between the feed inlet stream at an upstream boundary and the raffinate outlet stream at a downstream boundary. In this zone, the feed stock contacts the adsorbent, an extract component is adsorbed displacing the desorbent material from the adsorbent, and a raffinate stream is withdrawn. Since the general flow through zone 1 is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone 1 is the purification zone, zone 2. The purification zone is defined as the adsorbent between the extract outlet stream at an upstream boundary and the feed inlet stream at a downstream boundary. The basic operations taking place in zone 2 are the displacement from the non-selective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extract stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone or zone 3. The desorption zone is defined as the adsorbent between the desorbent inlet at an upstream boundary and the extract outlet stream at a downstream boundary. The function of the desorption zone is to allow a desorbent material which passes into this zone to displace the extract component which was adsorbed upon the adsorbent during a previous contact with feed in zone 1 in a prior cycle of operation. The flow of fluid in zone 3 is essentially in the same direction as that of zones 1 and 2.

In some instances, a separation zone comprising buffer zone 4, is utilized, which zone will, depending on the circumstances as hereinafter discussed, either be optional or required. This zone, defined as the adsorbent between the raffinate outlet stream at an upstream boundary and the desorbent inlet stream at a downstream boundary, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorption zone. Zone 4 will contain enough adsorbent so that raffinate material present in the raffinate stream passing out of zone 1 and into zone 4 can be prevented from passing into zone 3 thereby contaminating extract stream removed from zone 3. In the instances in which the fourth operational zone is not utilized the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated. The flow of fluid in zone 4 is essentially in the same direction as that of zones 1, 2 and 3.

A cyclic advancement of the input and output streams through the fixed bed of adsorbent can be accomplished by utilizing a manifold system in which the valves in the manifold are operated in a sequential manner to effect the shifting of the input and output streams thereby allowing a flow of fluid with respect to solid adsorbent in a countercurrent manner. Another mode of operation which can effect the countercurrent flow of solid adsorbent with respect to fluid involves the use of a rotating disc valve in which the input and output streams are connected to the valve and the lines through which feed input, extract output, desorbent input, raffinate output and backflushing output streams pass are advanced in the same direction through the adsorbent bed. Both the manifold arrangement and disc valve are known in the art. Specifically, rotary disc valves which can be utilized in this operation after modification to allow for backflushing can be found in U.S. Pat. Nos. 3,040,777 and 3,422,848. Both of the aforementioned patents, incorporated herein by reference thereto, disclose a rotary type connection valve in which the suitable advancement of the various input and output streams from fixed sources can be achieved without difficulty. A specific valve position will correspond to specific locations of the liquid access points on the chamber.

The time between each shift or advance is referred to as a "valve time". The time it takes for the cyclic advancement to proceed from a specific point in the column back to that point is referred to as a "cycle time". A "cycle" is completed upon the passing of each cycle time or upon each complete advancement through the entire column.

It is not necessary that all of the input or output streams be simultaneously used, and, in fact, in many instances some of the streams can be shut off while others effect an input or output of material. The apparatus which can be utilized to effect the process of this invention can also contain a series of individual beds connected by connecting conduits upon which are placed input or output taps to which the various input or output streams can be attached and alternately and periodically shifted to effect continuous operation. In some instances, the connection conduits can be connected to transfer taps which during the normal operations do not function as a conduit through which material passes into or out of the process.

It is contemplated that at least a portion of the extract output stream will pass into a separation means wherein at least a portion of the desorbent material can be separated to produce an extract product containing a reduced concentration of desorbent material. Preferably, but not necessary to the operation of the process, at least a portion of the raffinate output stream will also be passed to a separation means wherein at least a portion of the desorbent material can be separated to produce a desorbent stream which can be reused in the process and a raffinate product containing a reduced concentration of desorbent material. The separation means will typically be a fractionation column or an evaporator, the design and operation of either being well known to the separation art.

Reference can be made to D. B. Broughton U.S. Pat. No. 2,985,589 and to a paper entitled "Continuous Adsorptive Processing—A New Separation Technique" by D. B. Broughton presented at the 34th Annual Meeting of the Society of Chemical Engineers at Tokyo, Japan on Apr. 2, 1969, incorporated herein by reference thereto, for further explanation of the simulated moving-bed countercurrent process flow scheme.

When the adsorbent used in the adsorbent chamber or beds is an ion exchange resin a problem arises that does not exist in the known art simulated moving-bed processes which utilize adsorbent in the form of inorganic non-deformable solid particles. This problem is caused by the tendency of the resin, as liquid is forced through it, to change shape and become compacted whereby the interstitital void spaces between the adsorbent particles decrease in volume. Such tendency results in a dramatic and expodential with time increase in the pressure drop through the resin bed that has heretofore necessitated the eventual ceasation of operation.

I have observed that backflushing the resin is essential in that it reverses the above discussed compacting of the resin bed which occurs when the bed is in operation as a separation zone, and thereby enables reduction of the pressure drop across the bed upon commencement of flow of the liquid stream that is passed through the bed following backflushing. I have discovered a method for periodically backflushing the resin in a portion of the absorption column used in a simulated moving-bed process, which is compatible with the simulated moving-bed scheme. My invention thus achieves onstream pressure drop maintenance.

My method for periodically backflushing the resin comprises switching from the separation mode to the backflushing mode (both such modes as described in the Summary of the Invention) by stopping all separation mode process flows with the exception of the feed input stream, and by withdrawing only a backflushing output stream from the column upstream of the feed input stream inlet with respect to the direction of flow through the column during the separation mode. The adsorbent backflushed would be that between the feed input stream inlet and the backflushing outlet stream outlet. It is essential to note that in all cases the flow of fluid in the backflushing zone is in the opposite direction as that of zones 1, 2, 3 and 4 (assuming there is a zone 4 in the case in question) in the separation mode. The direction of flow in a given segment of the adsorbent bed is fixed and controlled by the quantity of liquid taken from or added to such segment at or across its boundaries.

The switch to backflushing will preferably occur immediately following each periodic advancement of step (h) of the separation mode. In such case, the same column inlet means (valves, lines, nozzle, etc.) for the feed input stream may be used for both an occurrence of the backflushing mode and the immediately following occurrence of the separation mode. The column outlet means used for the backflushing output stream during an occurrence of backflushing will lie between the feed input stream inlet means and the outlet means from which the extract output stream is withdrawn during the immediately following occurrence of the separation mode. A separate backflush system with valves, lines and hardware (specifically designed for the backflushing operation) which would be completely independent (except for the feed input line) of the like equipment servicing the column during the separation mode would be provided. Such a relationship between the input and output streams and between the two modes would enable the complete stepwise progression of backflushing throughout the entire adsorbent bed during each cycle. The duration of each occurrence of the backflushing mode is approximately equal to the duration of each occurrence of the separation mode and the flow rate of the feed input stream is approximately the same during both modes.

My invention realizes substantial advantages over the aforementioned continuous backflushing zone integrated into the simulated moving-bed scheme. One advantage is that less equipment is required for the intermittent backflushing of my invention as compared to continuous backflushing, particularly, my invention does not require the additional pump necessary in the latter scheme to enable backward flow through the backflushing zone when the backflushing zone progresses to the bottom of the adsorption column. Another advantage is that since the backflushing mode of my invention need not be effected simultaneously with the separation mode, far greater flexibility of operation is achieved with my invention, particularly because backflushing need be used only as required.

Although desorbent may be used for backflushing, feed material is the preferred backflushing material, particularly when the feed mixture comprises an aqueous solution of saccharides and the desorbent material comprises water. One reason for this preference is that the higher viscosity of the feed stream results in a higher pressure drop across the backflushing zone, thereby enhancing the effect of the backflushing. Another reason is that the resin tends to shrink in the presence of feed material which facilitates the redistribution of resin particles in the bed.

Although both liquid and vapor phase operations can be used in many adsorptive separation processes, liquid-phase operation is required for this process because of the lower temperature limitations of the resin, and because of the higher yields of extract product that can be obtained with liquid-phase operation over those obtained with vapor-phase operation. Adsorption conditions will include a temperature range of from about 20° C. to about 200° C. with about 20° C. to about 100° C. being more preferred and a pressure range of from about atmospheric to about 18 atmospheres being more preferred to insure liquid phase. Desorption conditions will include the same range of temperatures and pressures as used for adsorption conditions.

The size of the units which can utilize the process of this invention can vary anywhere from those of pilot-plant scale (see for example our assignee's U.S. Pat. No. 3,706,812) to those of commercial scale and can range in flow rates from as little as a few cubic centimeters an hour up to many thousands of liters per hour.

I claim as my invention:

1. In a process for separating an extract component from a fluid feed mixture comprising said extract component and a raffinate component in a simulated moving-bed countercurrent flow system having simulated movement in but one direction by employment of a stationary adsorbent consisting essentially of an ion exchange resin having a greater selectivity for said extract component than for said raffinate component, the separation mode of such process comprising the steps of:

(a) maintaining fluid flow through a column of said adsorbent, which column contains separation zones comprising at least an adsorption zone, a purification zone, and a desorption zone, said zones being serially interconnected with the terminal zones of said column connected to provide a continuous connection of said zones, said fluid flow in said separation zones being in a single direction;

(b) maintaining said adsorption zone in said column defined by the adsorbent located between a feed input stream at an upstream boundary of said zone and a raffinate output stream comprising said raffinate component and said desorbent material at a downstream boundary of said zone;

(c) maintaining said purification zone immediately upstream with respect to said single direction, of said adsorptive zone, said purification zone defined by the adsorbent located between an extract output stream at an upstream boundary of said purification zone and said feed input stream at a downstream boundary of said purification zone;

(d) maintaining said desorption zone immediately upstream, with respect to said single direction, of said purification zone, said desorption zone defined by the adsorbent located between a desorbent input stream at an upstream boundary of said zone and said extract output stream at a downstream boundary of said zone;

(e) passing said feed mixture into said adsorption zone at adsorption conditions to effect the selective adsorption of said extract component by said adsorbent in said adsorption zone and withdrawing a raffinate output stream from said adsorption zone comprising said raffinate component and desorbent material;

(f) passing a desorbent material into said desorption zone at desorption conditions to effect the displacement of said extract component from the adsorbent in said desorption zone;

(g) withdrawing an extract output stream comprising said extract component and desorbent material from said desorption zone;

(h) periodically advancing through said column of adsorbent in a downstream direction with respect to fluid flow in said adsorption zone the feed input stream, raffinate output stream, desorbent input stream, and extract output stream, to effect the shifting of zones through said adsorbent and the production of extract output and raffinate output streams; and (i) periodically backflushing said adsorbent by periodically passing a backflush mode stream through said feed input stream as the backflush input stream and withdrawing a backflushing output stream as the backflushing output stream from said column, said backflushing output stream being upstream, with respect to said single direction of said feed input stream to effect the periodic backflushing of said adsorbent located between said feed input stream and said backflushing output stream.

2. The process of claim 1 wherein said backflushing mode is effected immediately following each periodic advancement of step (h).

3. The process of claim 2 wherein the same column inlet means for said feed input stream is used for both an occurrence of said backflushing mode and the immediately following occurrence of said separation mode.

4. The process of claim 2 wherein the column outlet means used for said backflushing output stream during a specific occurrence of said backflushing mode is located between said feed input stream inlet means and said outlet means from which said extract output stream is withdrawn during the immediately following occurrence of said separation mode.

5. The process of claim 1 wherein the duration of each occurrence of said backflushing mode is approximately equal to the duration of each occurrence of said separation mode and the flow rate of the feed input stream is approximately the same during both modes.

6. The process of claim 1 wherein there is included the step of maintaining an additional separation zone comprising a buffer zone immediately upstream from said desorption zone, said buffer zone defined as the adsorbent located between the desorbent input stream at a downstream boundary of said buffer zone and a raffinate output stream at an upstream boundary of said buffer zone.

7. The process of claim 1 wherein said ion exchange resin comprises an alkali metal or alkaline earth metal salt of a nuclearly sulfonated styrene cation exchange resin containing a cross-linking agent.

8. The process of claim 7 wherein said salt comprises a calcium salt.

9. The process of claim 7 wherein said ion exchange resin comprises particles in a size range of from about 20 to about 40 mesh.

10. The process of claim 7 wherein said cross-linking agent comprises divinylbenzene.

11. The process of claim 10 wherein the content of said crosslinking agent of said ion exchange resin is about 4% by weight.

12. The process of claim 1 wherein said fluid feed mixture comprises an aqueous solution of saccharides.

13. The process of claim 12 wherein saccharides comprise fructose and glucose.

14. The process of claim 13 wherein said extract component comprises fructose and said raffinate component comprises glucose.

15. The process of claim 12 wherein said desorbent material comprises water.

* * * * *